United States Patent [19]
Schwendeman et al.

[11] Patent Number: 5,301,354
[45] Date of Patent: * Apr. 5, 1994

[54] SATELLITE BASED GLOBAL PAGING SYSTEM

[75] Inventors: Robert J. Schwendeman, Pompano Beach; William J. Kuznicki, Coral Springs, both of Fla.

[73] Assignee: Motorola, Inc., Schaumburg, Ill.

[*] Notice: The portion of the term of this patent subsequent to Aug. 24, 2000 has been disclaimed.

[21] Appl. No.: 14,593

[22] Filed: Feb. 8, 1993

Related U.S. Application Data

[63] Continuation of Ser. No. 444,187, Nov. 30, 1989, Pat. No. 5,239,670.

[51] Int. Cl.$^5$ ............ H04B 7/185; H04B 7/195; H04Q 7/02
[52] U.S. Cl. ............ 455/13.1; 455/33.1; 455/54.1; 455/56.1; 340/825.44
[58] Field of Search ............ 455/12.1, 13.1, 13.2, 455/13.3, 13.4, 15, 25, 33.1, 33.2, 33.3, 53.1, 54.1, 54.2, 56.1; 379/58, 59, 60, 63; 370/104.1, 70, 94.1; 342/376, 356, 357; 340/825.44, 825.47; 371/35

[56] References Cited

U.S. PATENT DOCUMENTS

| | | | |
|---|---|---|---|
| Re. 32,905 | 4/1989 | Baran | 455/13.2 |
| 3,497,807 | 2/1970 | Newton | 455/13.1 |
| 4,018,993 | 4/1977 | Edstrom | 455/12.1 |
| 4,105,973 | 8/1978 | Arnold et al. | 370/104.1 |
| 4,145,573 | 3/1979 | Arnold | 370/104.1 |
| 4,178,476 | 12/1979 | Frost | 340/825.44 |
| 4,188,578 | 2/1980 | Reudink et al. | 370/104.1 |
| 4,261,054 | 4/1981 | Scharla-Nielsen | 455/13.4 |
| 4,268,831 | 5/1981 | Valentino et al. | 342/376 |
| 4,381,562 | 4/1983 | Acompora | 455/13.3 |
| 4,567,485 | 1/1986 | Oshima et al. | 342/356 |
| 4,628,506 | 12/1986 | Sperlich | 455/13.3 |
| 4,644,347 | 2/1987 | Lucas et al. | 455/56.1 |
| 4,644,351 | 2/1987 | Zabarsky et al. | 455/33.1 |
| 4,670,905 | 6/1987 | Sanduos et al. | 455/56.1 |
| 4,672,655 | 6/1987 | Koch | 455/12.1 |
| 4,672,656 | 6/1987 | Pfeiffer et al. | 455/12.1 |
| 4,689,625 | 8/1987 | Barmat | 342/356 |
| 4,718,066 | 1/1988 | Rogard | 371/35 |
| 4,718,109 | 1/1988 | Breeden et al. | 455/56.1 |
| 4,763,129 | 8/1988 | Perrotta | 455/13.2 |
| 4,849,750 | 7/1989 | Andros et al. | 340/825.44 |
| 4,872,015 | 10/1989 | Rosen | 455/13.3 |
| 4,876,737 | 10/1989 | Woodworth et al. | 455/12.1 |
| 4,901,310 | 2/1990 | Ichiyoshi | 370/70 |
| 4,916,539 | 4/1990 | Galumvedr | 340/825.47 |
| 5,003,534 | 3/1991 | Gerhardt et al. | 370/94.1 |
| 5,010,317 | 4/1991 | Schwendeman et al. | 455/13.2 |
| 5,014,066 | 5/1991 | Counselman, III | 342/357 |

OTHER PUBLICATIONS

DeRe, Enrico, "An Integrated Satellite-Cellular Land Mobile System For Europe".
Rafferty et al., "RF Development for Mobile-Satellite Systems", MNS & CT, Nov. 1988.

*Primary Examiner*—Reinhard J. Eisenzopf
*Assistant Examiner*—Lisa D. Charouel
*Attorney, Agent, or Firm*—R. Louis Breeden; Thomas G. Berry; Daniel R. Collopy

[57] ABSTRACT

A satellite based paging communication system comprises a plurality of terrestrial stations capable of communicating the paging information with at least one satellite. The satellite(s), in turn, are capable of communicating the paging information to at least one terrestrial receiver or terrestrial station. Also included is at least one control station for determining where and how to deliver the paging information to one or more of a plurality of terrestrial receivers (pagers), at least some of which are capable of receiving the paging information from one or more of the satellites and one or more of the terrestrial stations.

12 Claims, 13 Drawing Sheets

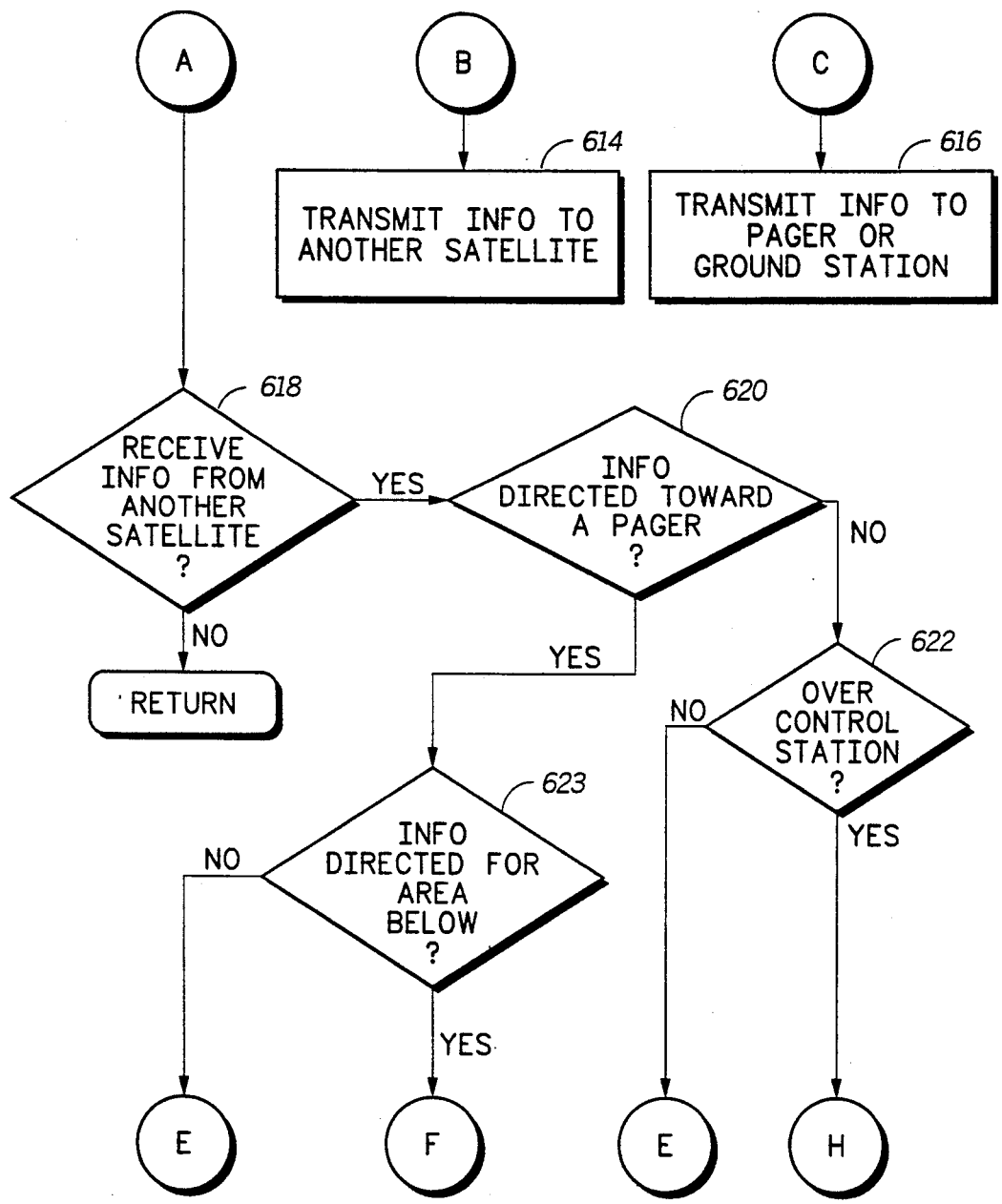

SATELLITE BASED GLOBAL PAGING SYSTEM

This is a continuation of application Ser. No. 07/444,187, filed Nov. 30, 1989, now U.S. Pat. No. 5,239,670.

TECHNICAL FIELD

This invention relates generally to paging communication systems, and more specifically to wide geographic area paging systems, and is particularly directed toward a satellite based global paging communication system.

BACKGROUND

Historically, paging systems provided service to a limited geographic area using a relatively high-power centralized transmitting site. This arrangement worked well in small cities and municipalities, but often proved unsuitable for large metropolitan areas. To adequately serve a larger geographic area, paging systems began to simulcast (i.e., transmit the same message at substantially the same time) from several transmitters strategically positioned to provide wide-area coverage. In such a system, an individual having a selective call receiver (pager) could receive information anywhere in the metropolitan paging service area.

Today, the trend in paging communication is to provide even greater geographic coverage. Nationwide paging systems are often contemplated in an attempt to provide paging messages to customers without regard to where they are in the United States (for example). One known multi-city paging system employs satellites to transmit paging messages to ground repeaters in approximately eighty cities so that their customers can be paged while travelling in any of the covered cities. Regrettably, these more recent paging systems suffer from paging traffic bottle-necks resulting from the required satellite-to-ground repeater link. Accordingly, a need exists for a paging communication system that provides everyone with convenient, reliable and efficient paging service.

SUMMARY of the INVENTION

Briefly, according to the invention, a paging communication system comprises at least one terrestrial station capable of communicating the paging information with at least one satellite, and for communicating the paging information with at least one control station. The satellite(s) of this system are capable of communicating the paging information to at least one terrestrial receiver (e.g., pager) or to a terrestrial station. The system further includes at least one control station for determining where and how to deliver the paging information, and for directing the satellite(s) and/or the terrestrial stations to appropriately deliver the paging information to one or more terrestrial receivers that may operate anywhere on a celestial body.

BRIEF DESCRIPTION of the DRAWINGS

FIGS. 6a–6g are flow diagrams outlining the operation of the satellites of FIGS. 1, 2 or 5.

DESCRIPTION of the PREFERRED EMBODIMENT

Fundamentally, the present invention provides a world-wide communication system designed to call (page) individuals having a selective call receiver (pager). According to the invention, any contemporary selective call receiver manufactured by any paging manufacturer may be used in the present inventive system, which automatically adapts some portion of itself to accommodate the pager(s) that are designated to receive a paging message. As will become hereinafter apparent, the accommodating nature of the present invention serves the individual using the pager (paging customer), in that a broad range of operational flexibility is provided in a system that can apportion system use fees based upon the needs and instructions of those that use the system.

THE SYSTEM

Figure 1:
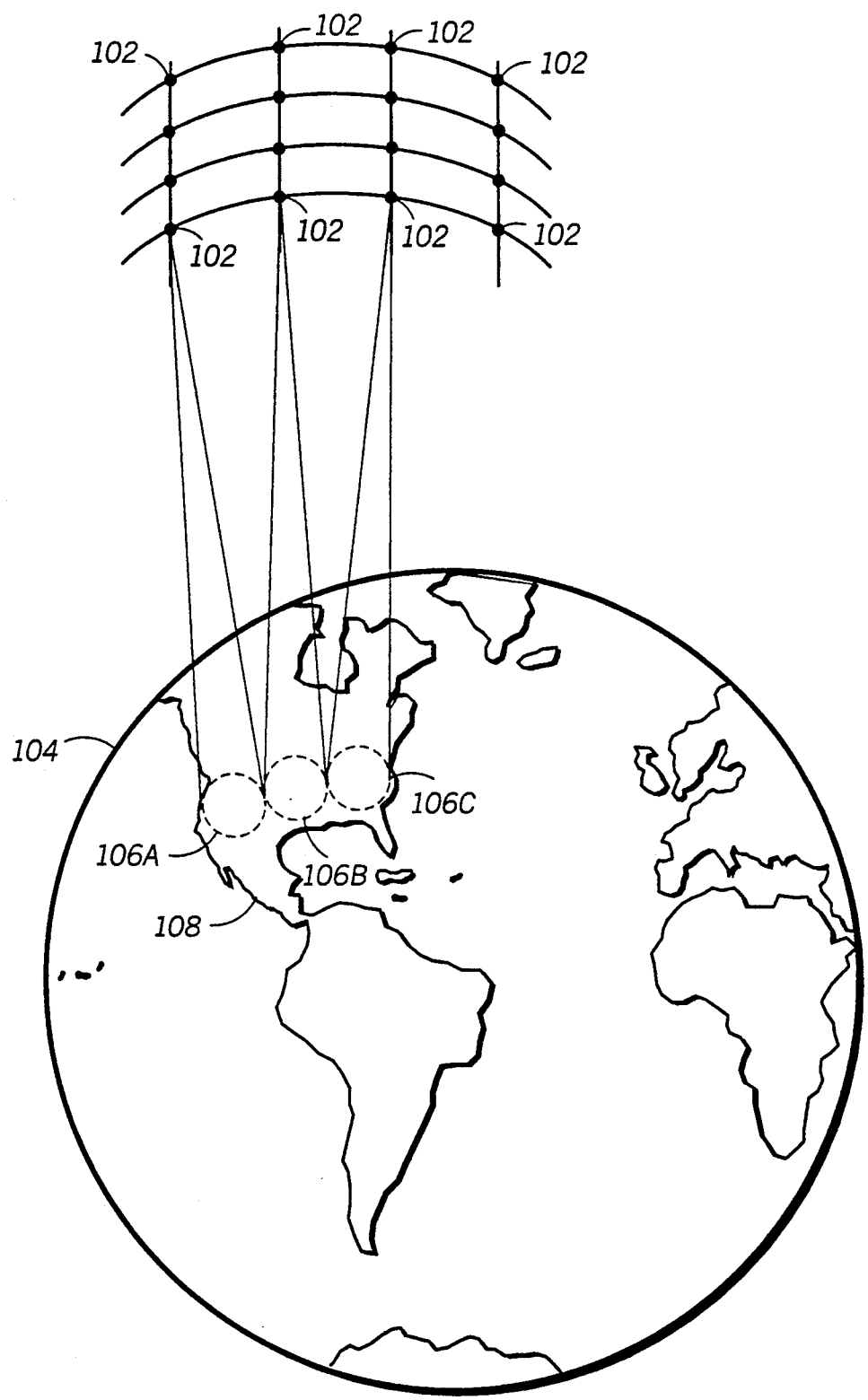
FIG. 1 is an illustration of an orbiting satellite network in accordance with the present invention.

Referring to FIG. 1, the inventive communication system of the present invention can be seen to be based on a network of satellites 102 disposed about a celestial body 104. Preferably, seventy-seven (77) satellites are deployed in various orbits about the celestial body (or planet) so as to be able to communicate a signal to a receiver anywhere on the planet. Of course, more or fewer satellites could be used depending on the transmission capabilities of the satellites and the desired communication coverage of the planet. Also, one or more geostationary satellites could be used. According to the invention, the seventy-seven orbiting satellites are arranged in seven (7) orbit planes to form a satellite network so as to provide communication regardless of whether the receiver is operating on a land mass, on a body of water, or traveling by aircraft (provided that the aircraft is within the beam of the transmitting satellite).

Referring still to FIG. 1, three of the satellites are illustrated as communicating with a respective area 106a–10c of a land mass 108. Each area 106 is commonly referred to as the "footprint" of the transmitting beam of each satellite. According to the present invention, each satellite is capable of transmitting paging information either to paging receivers, or to ground stations located within the footprint of a particular satellite. In the preferred embodiment, the transmission footprint of each satellite comprises thirty-seven (37) individual transmission lobes as will become hereinafter apparent.

Within the satellite network, each satellite operates substantially independently of the others; although the entire network is coordinated by a centralized control facility. To provide a global paging system capable of accommodating the various operational protocols developed for paging receivers and systems, the present invention adapts a portion of itself for each paging event to the receiver (or receivers) designated to receive the paging information. That is, for example, paging receivers operating in area 106a may receive paging information directly from the satellite using Golay Sequential Coding (GSC). Simultaneously, paging receivers operating in area 106b can receive information from its satellite, or a terrestrial base station (or both), using the POCSAG protocol. Further, selective call receivers (pagers) operating in area 106c may comprise existing tone-only or tone-and-voice paging receivers that receive information relayed from the satellite through an existing contemporary paging system. Thus, the present invention adapts that portion of the system required to communicate with the pagers to be contacted. In this way, paging receivers provided by any manufacturer may be used in any part of the planet regardless of the fact that local areas of the planet may primarily use one paging protocol.

Figure 2:
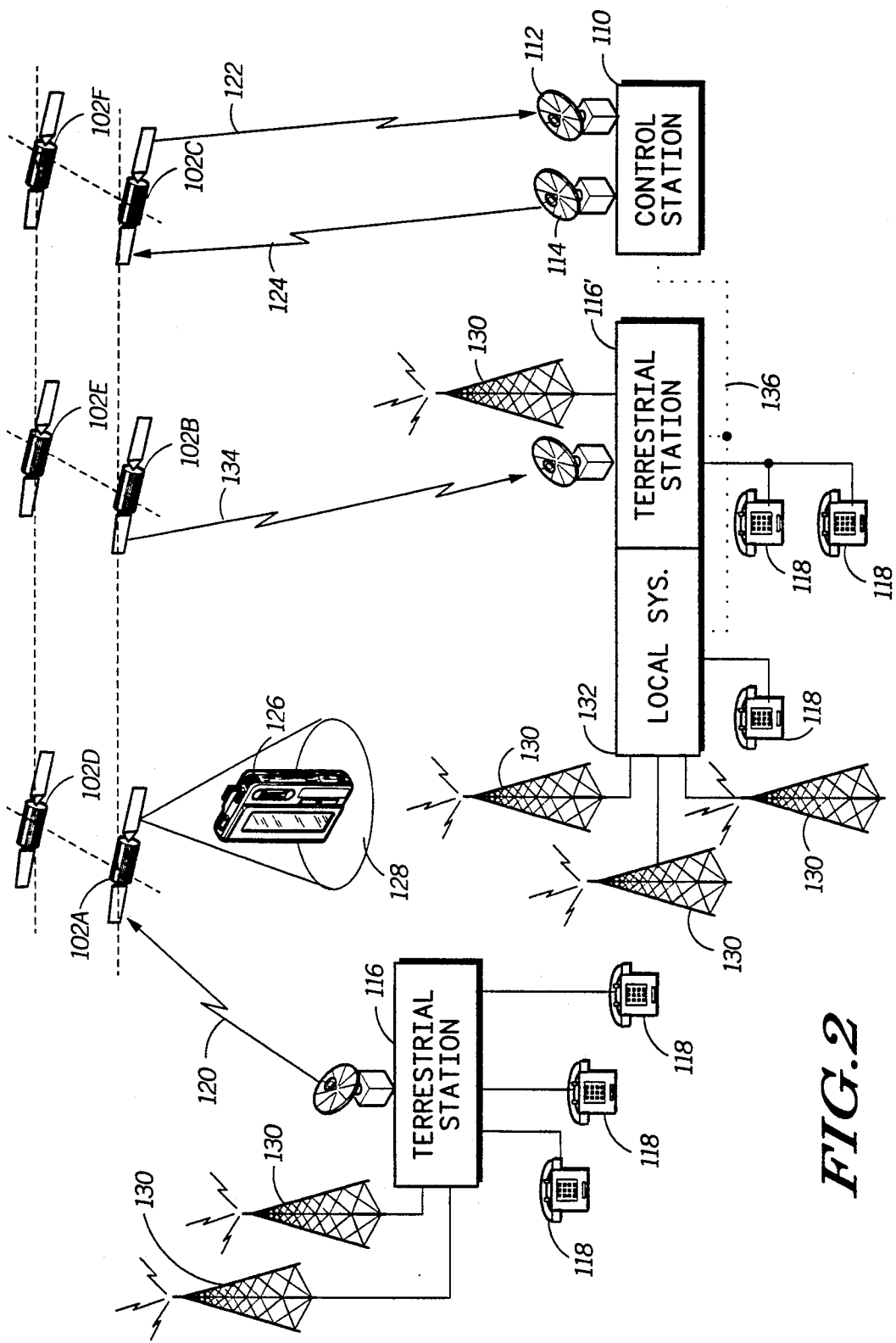
FIG. 2 is a diagram illustrating system operation in accordance with the present invention.

Referring to FIG. 2, a more detailed illustration of a portion of the global paging system is shown. As discussed in conjunction with FIG. 1, the present invention employs an orbiting space based backbone of satellites 102a-102f (6 shown) that orbit the planet in a plurality of orbits. A coordinating intelligence for the system is provided by a control station 110, which essentially comprises a large computing center (or other suitable information storage and processing center) that maintains a data library of every paging receiver registered to operate on the global system, together with its preferred location to receive paging messages, the preferred paging protocol, and other parameters as may be necessary or desired to provide an effective paging service. In the preferred operation, the control station 110 receives messages from the satellite presently positioned above the control station by an antenna 112, which routes all incoming paging requests from terrestrial base stations around the planet. Outgoing paging information is provided by an antenna 114 to the satellite network so that the paging information may be directed to the appropriate paging receiver(s). Optionally, more than one control station could be used, however, the maintenance of the data base library could be more difficult. In any event, the paging information is processed by the control station 110 to include information as to where and how the paging message should be delivered. This processing would include frequency selection, protocol selection, and other information such as whether the satellite should deliver the page directly or via a terrestrial station located in the approximate geographic area of the paging receiver.

To initiate a page, individuals preferably contact a terrestrial station 116 using telephone-type devices 118 through either a public or private telephone network. The terrestrial station 116 relays the paging message by any appropriate protocol to a satellite (illustrated as 102a) via transmission 120. Upon receipt of this information, satellite 102a determines that it is not currently over the control station, and therefore relays this information via the satellite network to an appropriate satellite for down-link transmission to the control station. Thus, in this example, the message would proceed from satellite 102a to 102b, and then by inter-satellite link to satellite 102c. Since the control station 110 resides within the transmission "footprint" of satellite 102c, the paging request is broadcast to the control station 110 by a transmission 122.

Upon receipt of a paging request from the satellite network, the control station analyzes the identification (ID) code of the selective call receiver to be paged to determine the service area requested by the paging receiver. That is, each individual having a paging receiver operative in the present inventive system is permitted to define the service area in which he or she wishes to receive paging information. Thus, an individual may elect to receive paging information only within one city or municipality. Others may wish to receive paging information in multiple states. Still others may desire to receive information across entire countries, continents, or globally so that they may receive a paging message wherever they are in the world. The present invention contemplates that the central station 110 will maintain this information for each selective call receiver registered to operate within the global system. In this way, the user has some control over the billing amount by specifying the coverage area desired. That is, the fees customarily charged for using the paging systems are allocated upon the extent of use specified by the paging receiver. In this way, costs can be fairly allocated among the several paging users depending upon the activity required by the communication network. Of course, the billing information itself is administered by the control station 110. Accordingly, the control station processes the incoming paging requests and instructs the satellite network where the paging information should be delivered based upon the instructions of the individual to be paged. Should this individual desire to travel or otherwise change his or her location for receiving messages (whether permanently or temporarily), that person must inform the paging service provider so that the control station's data library may be updated.

The control station 110 also determines how the paging message should be delivered to the individual being paged by examining the data library to extract information identifying the preferred paging protocol(s) and operational frequency(ies) of the selective call receiver to be paged. This information is also preferably provided by the paging service provider at the time of registration of a pager on the global system. Of course, this information may be updated from time to time if the individual purchases another selective call receiver or is temporarily using a loaned pager during the repair of his or her registered receiver.

After determining where and how the paging information should be delivered, the control station 110 returns the paging information to the satellite network (satellite 102c in FIG. 2) via transmission 124. In this example, satellite 102c receives the paging information that is to be directed to the area below the transmitting "footprint" of satellite 102a. Accordingly, the paging information is routed through satellite 102b to 102a, where the paging information is transmitted to a paging receiver 126 operating in the geographic region covered by the satellite 102a. Preferably, as will be hereinafter described in further detail, each of the transmitting beams from the satellite comprises thirty-seven (37) individual transmitting lobes; these lobes collectively representing the largest "footprint" in which the satellite may communicate information.

For delivery of other paging messages, each terrestrial station 116 may receive information from the satellite network and route the paging information through local transmitting sites 130. These paging events may be executed using the same protocol as the down-link transmission from the satellite, or by translating the down-link protocol into another protocol (i.e., a protocol compatible with the selective call receiver to be paged) so as to be adaptive to the paging receiver that is intended to receive the paging message. Moreover, the terrestrial stations of the present invention, can be coupled to a contemporary local paging system 132, so as to provide paging messages to existing paging receivers that are not capable of receiving paging messages directly from the satellite network. Thus, a paging message received in transmission 134 by the terrestrial station 116' can be processed and converted to paging information recognizable by the existing local paging system 132. The converted paging information would be processed and disseminated to the transmitting sites 130 associated with the local system in the same manner as any local paging request. As is known, the transmitting sites 130 may represent centralized transmitting sites for different areas or cities, or may be simulcast transmitting sites to provide contemporaneous transmission coverage to a wider geographic area. In any event, the present invention contemplates communicating directly from the satellite network in geographic areas that does not employ ground based infrastructure or existing contemporary equipment, or terrestrial based relay stations to repeat or simulcast paging information on an appropriate paging protocol and frequency so as to support large municipalities. In this way, the terrestrial stations may be used to off-load a portion of the paging traffic from the satellite network, provide an alternate transmission point in circumstances where the paging receiver cannot correctly receive the paging information directly from the satellite network (i.e., shadowed), or convert the down-link protocol to a protocol and frequency compatible with contemporary equipment.

Optionally, for those terrestrial stations and local systems physically residing in the geographic area that the control station 110 is physically located, an optional direct communication link 136 may be employed to eliminate the need to go to the satellite network to communicate paging requests. As will be appreciated by those skilled in the art, the transmitting footprints of the satellites 102 cover a wide geographic area. Those terrestrial stations and local systems within the same operating footprint as the control station may therefore be coupled directly to the control station 110, since communications between such sites would be repeated by the satellite above both of them.

THE SATELLITE(S)

Figure 3:
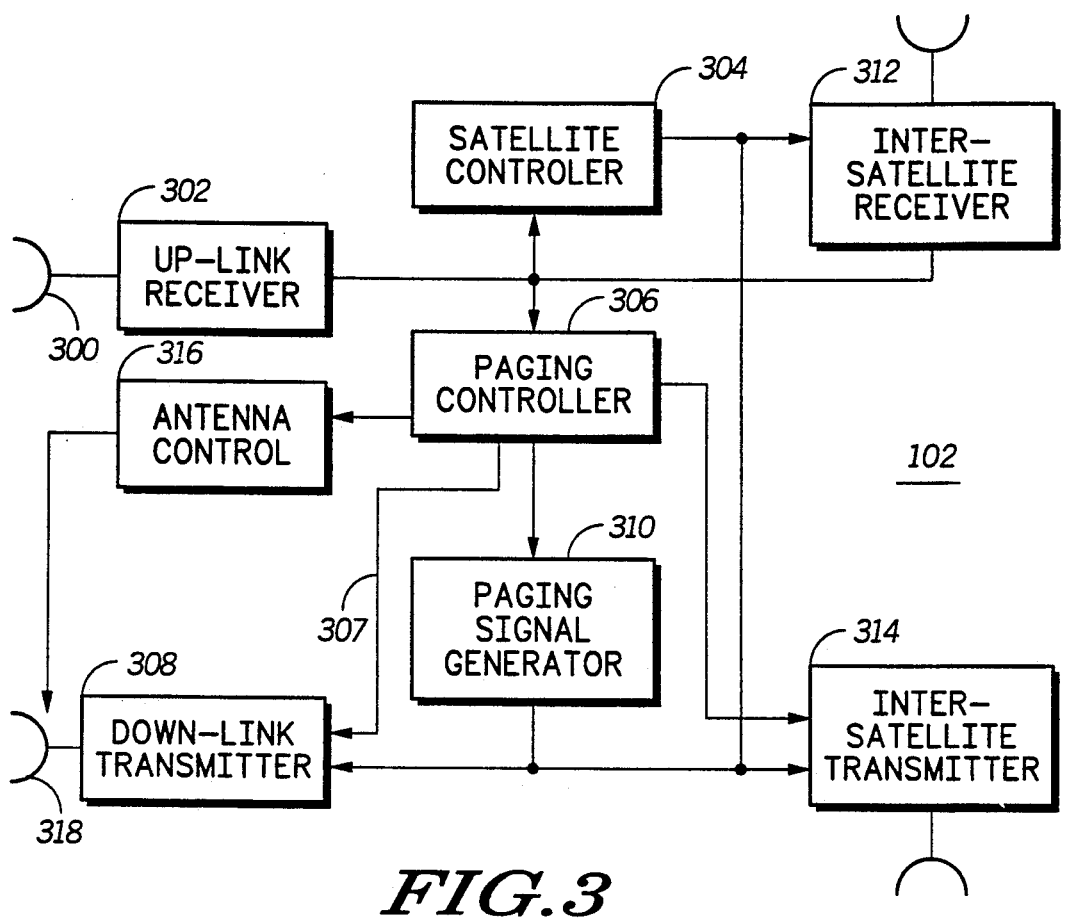
FIG. 3 is a block diagram of a satellite of FIGS. 1 or 2.

Referring to FIG. 3, a satellite 102 is shown in block diagram form. Preferably, each satellite comprises a conventional low-orbiting satellite such as those commercially available. Alternately, one or more geostationary satellites may be used. Each satellite is placed in orbit by a suitable launch vehicle such as via America's Space Shuttle Program. According to the invention, the preferred orbit is one that is highly inclined, so as to provide effective global communication coverage. Lower inclination orbits may also be used, however, additional satellites would be required to achieve effective communication coverage. Once in orbit, a conventional solar cell array (not shown) is opened to provide power to the satellite 102. Following this, the satellites are brought "on-line" using known techniques, such as, for example, by using contemporary telemetry, tracking, and control (TT&C) protocols to form a satellite network.

Up-link transmissions are received by an up-link antenna 300 and decoded by an up-link receiver 302. The up-link receiver is coupled to a conventional satellite controller 304 and a paging controller 306 so as to appropriately route satellite control information and decoded paging information. The satellite controller 304 performs conventional satellite control functions such as orbit maintenance, position tracking, and other appropriate functions as directed by control personnel on the planet. The satellite controller 304 is also coupled to the satellite's down-link transmitter 308, so as to provide any information requested by ground based control personnel.

As shown in FIG. 3, the payload of the satellite 102 is occupied by the paging controller 306 and a paging signal generator 310. Upon receipt of paging information, the paging controller must determine whether to transmit the paging message toward the planet (i.e., page a selective call receiver or send the page information to a ground station for relay to the selective call receiver), or to another satellite (for routing to the control station or another satellite for transmission) in the satellite network. Accordingly, an inter-satellite receiver 312 and transmitter 314 are coupled to the paging controller 306 so that the paging information can be appropriately routed. Additionally, the satellite controller 304 is coupled to the inter-satellite receiver and transmitter so as to communicate network control information as required for the maintenance of the satellite network. Optionally, a single inter-satellite transceiver may be used provided that its has a steerable antenna system to be able to communicate with its neighboring satellites in the satellite network. Also, multiple inter-satellite transceivers could be used provided that the satellites size and weight were not adversely impacted, and so long as it is not cost prohibitive.

The paging controller 306 determines what and how to transmit in large part in response to the type of information received. For example, up-link transmissions from a ground station should ordinarily be routed to the control station, while up-link transmissions from the control station usually contain information as to where and how the paging message should be delivered. Inter-satellite communications can, of course be either paging request or paging information, and the paging controller determines appropriate routing chiefly by examining its present position (which is monitored by the satellite controller 304) and the destination of the request or information. Should the satellite controller determine that the received paging information should be transmitted toward the planet, the paging signal generator 310 is used to provide the appropriate protocol and frequency selection. That is, the paging signal generator may deliver the paging information using any known paging protocol or any convenient protocol if transmitting to a ground station or to the selective call receiver hereinafter described. For each paging transmission, this information is preferably provided by the control station, or defaults to a predetermined protocol. Additionally, the down-link frequency selection is also made in accordance with the delivery instructions provided by the control station.

Prior to the actual transmission, the paging controller 306 examines the paging information to determine the desired communication coverage specified by the individual to be paged. According to the invention, this information is provided to the paging controller by the control station and is provided to an antenna control system 316 to adjust the "footprint" of the satellite's transmission beam. This is preferably accomplished by controlling which of a plurality of individual transmission lobes are activated. According to the invention, the down-link antenna comprises one that has thirty-seven transmission lobes. In this way, relatively fine control of the satellite's transmitting signal may be achieved. Additionally, if the transmission is directed toward a terrestrial station or the control station (as opposed to a pager) the transmitter power can be reduced under the control (307) of the paging controller 306. In this way, the system takes advantage of the antenna gain available in the dish-type antennas commonly employed in ground based stations. The reduction in transmitter power in these instances conserves energy within the satellite(s), which of course, are powered by batteries charged by solar panels.

Figure 4:
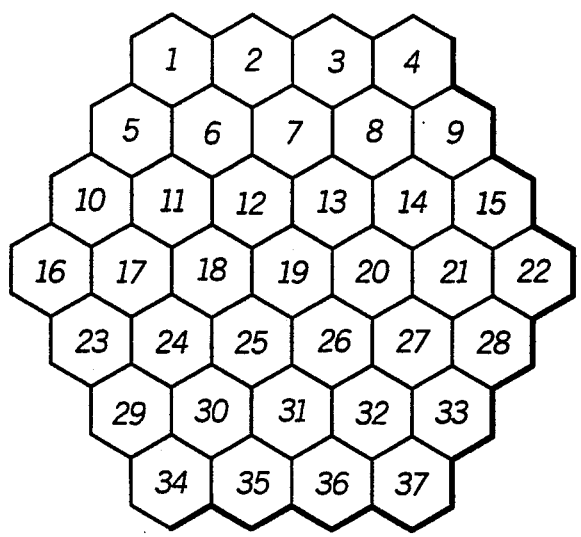
FIG. 4 is an illustration of a satellite transmission footprint.

Referring to FIG. 4, a graphical depiction is provided to illustrate the preferred satellite transmission "footprint". As previously mentioned, the preferred satellite down-link transmitting system includes an antenna having a plurality of individual lobes. In FIG. 4, the hexagonal cell format commonly used in conjunction with cellular telephone service is used for convenience to illustrate to user selectable coverage aspect of the present invention. Those skilled in the art will appreciate that the actual transmission patterns of the satellite's antenna lobes do not comprise perfect hexagons.

According to the invention, each individual is permitted to specify the areas in which he or she will receive paging messages. For example, if an individual only wished to receive pages at home or in the office, areas 17 and 12 may be specified. In an alternate example, wider coverage may be provided by specifying areas 12-14, 18-20, and 25-26. In fact, any arrangement of coverage areas (contiguous or non-contiguous) may be provided including receiving paging information under the entire thirty-seven transmitting lobes of one satellite and some or all of the lobes of any of the other satellites in the entire satellite network. In this way, paging service may be provided using any paging format or protocol on a global coverage basis for those desiring such coverage, while local area coverage may be may also be provided to those desiring only local coverage and the lower operational costs associated therewith.

Figure 5:
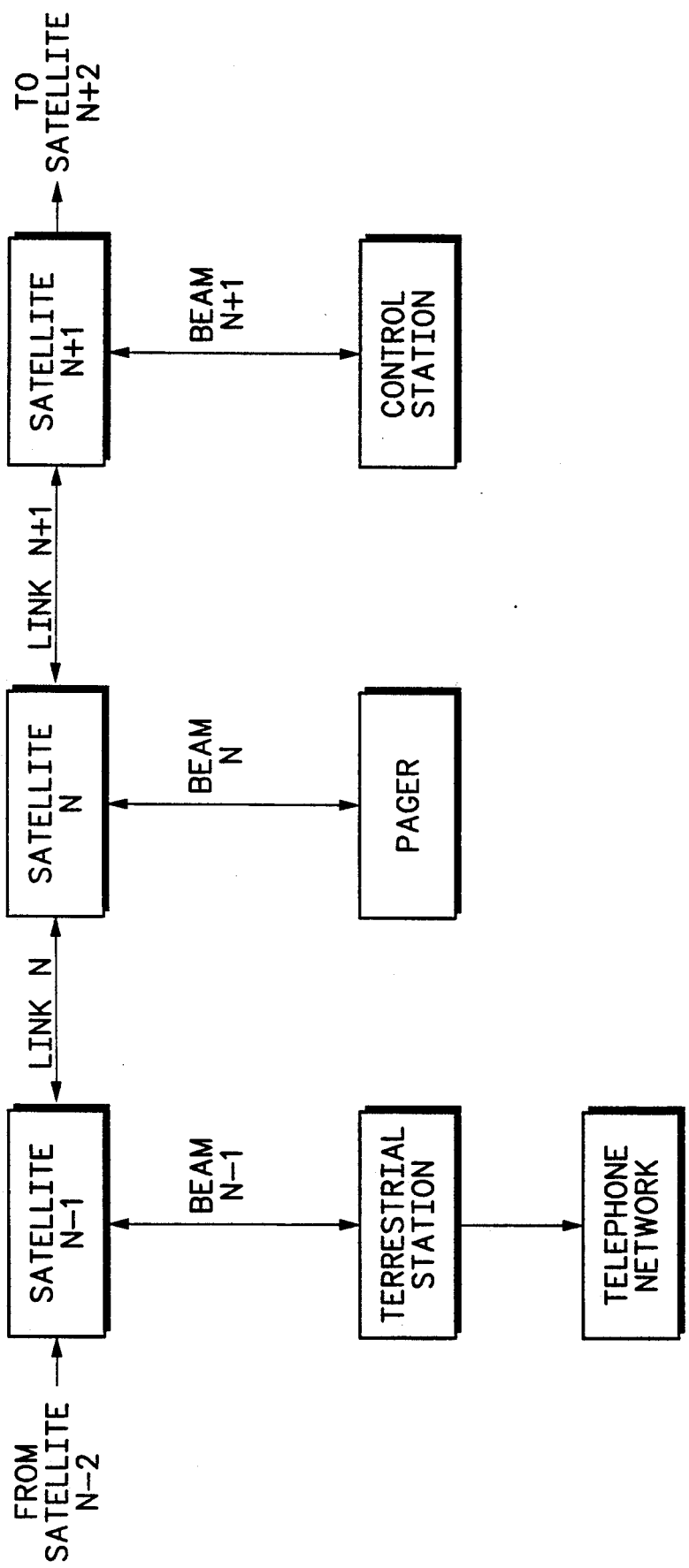
FIG. 5 is a diagram illustrating satellite communication paths and links.
Figure 6A:
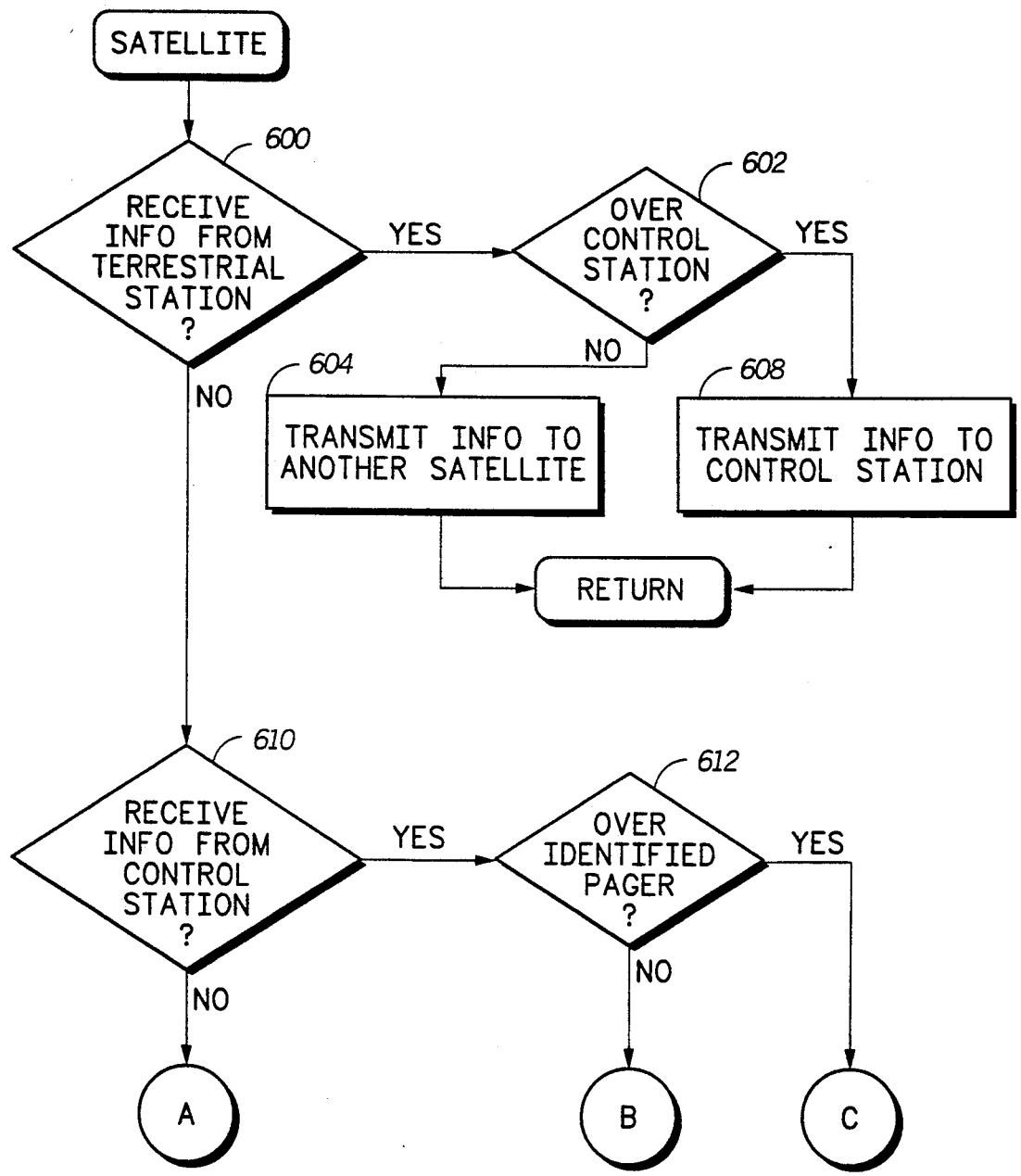
Figure 6E:
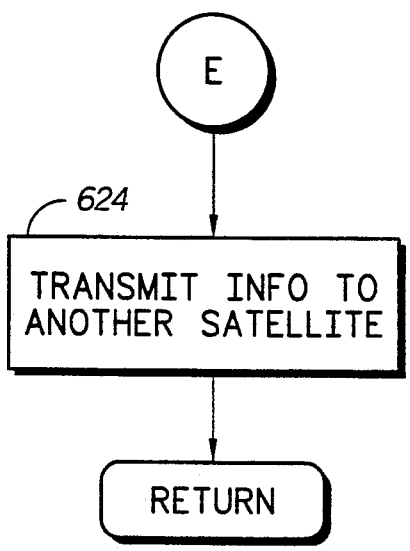
Figure 6F:
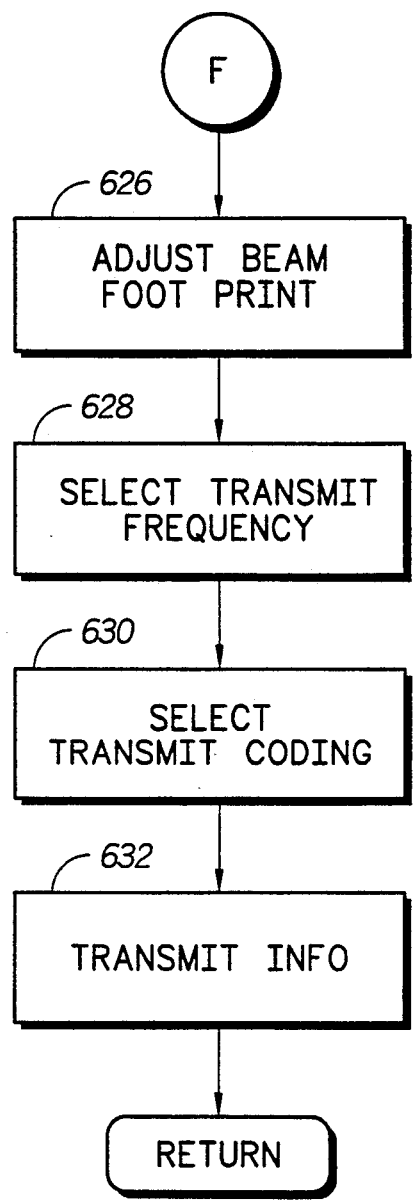
Figure 6G:
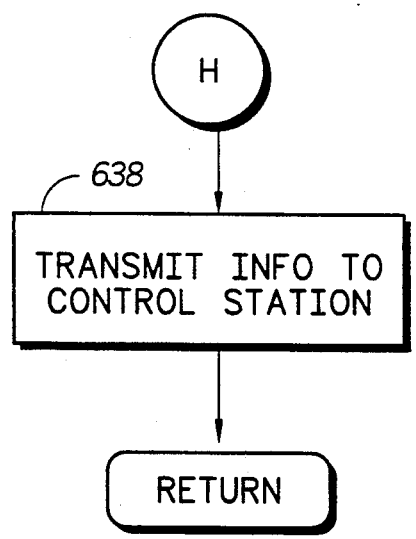

The satellites' communication abilities may be further described in conjunction with FIG. 5. Three satellites are shown engaged in both inter-satellite communication and terrestrial up-link/down-link communication. The illustrated satellites (N−1, N, and N+1) may be satellites in the same orbiting plane, or be represent one satellite in three contiguous orbit planes. In either event, inter-satellite communications is the same. That is, each satellite is capable of communicating with a previous and next satellite in the same orbiting plane, and with a satellite in a previous and next orbit. This arrangement provides a satellite network capable of effectively disseminating paging information to any point on the orbited celestial body.

As shown in FIG. 5, satellite N communicates information with satellite N−1 via link N, and with satellite N+1 via link N+1 (and so on). These transmissions are made using the inter-satellite transmitter and receiver (or optional transceiver) discussed above in conjunction with FIG. 3. In one embodiment, conventional microwave communication is used for the inter-satellite links, although known optical media (e.g., lasers) may be used if not cost prohibitive.

Also illustrated in FIG. 5 are the fundamental up-link and down-link communication abilities of the satellite network of the present invention. As shown, satellite N−1 may communicate with a terrestrial or ground station that may in turn be coupled to an existing conventional paging network. The communication path used for terrestrial stations (Beam N−1) is usual a bidirectional path so that paging requests received via a telephone-type network may be forwarded to the control station, while paging information can be received and processed from the satellite network. Optionally, if desirable in any particular implementation, a terrestrial station may utilize only an up-link or a down-link communication path. Satellite N is shown communicating directly with a pager via Beam N. This provides communication in those area of the planet that does not have existing equipment and where it would be un-economical or otherwise undesirable to locate a ground station. A paging receiver suitable to receive paging information directly from the satellite network is hereinafter described. Another fundamental communication page is illustrated as Beam N+1 from satellite N+1. In this example, satellite N+1 is the satellite over the control station, and therefore, is the satellite ultimately responsible for finally communicating paging requests to the control station, and for initially receiving paging information from the control station. According to the invention, the inter-satellite and up-link/down-link communication capabilities of the satellite network permit an individual having a paging receiver to receive paging messages anywhere on the celestial body.

Referring to FIGS. 6a-6g, the preferred operation of the satellites begins with decision 600, which determines whether information has been received from a ground station. An affirmative determination from decision 600 generally means that a paging request has been transmitted from one of the ground stations and should be directed to the control station for a determination of where and how the paging message should be delivered. Accordingly, decision 602 determines whether the satellite is presently over the control station. This determination is accomplished using known mechanisms within the satellite controller by examining the current position of the satellite over the planet and comparing this information with the known location of the control station. If the determination of decision 602 is that the satellite is currently over the control station, the information is transmitted to the control station (step 608) (This transmission may optionally be made at a lower transmitter power since the control station employs a high gain dish-type antenna). Conversely, a negative determination of decision 602 results in the information being transmitted to another satellite. As previously discussed, the other satellite may either be in the same orbiting plane or an adjacent orbiting plane as that of the satellite that first received the information. In this way, the information progresses through the satellite network until it is directed to the control station.

Assuming that the determination of decision 600 is that information was not received from a terrestrial or ground station, the routine proceeds to decision 610, which determines whether information has been received from the control station. According to the invention, the control station processes each paging request and makes determinations as to where and how the paging message should be delivered. Therefore, the control station typically up-links all paging information to the satellite network for appropriate distribution through the satellite network and back to the planet (either directly or by way of a terrestrial or local station). Thus, should the determination of decision 610 be that the information was received from the control station, the routine proceeds to decision 612, which determines whether the satellite is presently over the identified pager (or pagers) that is to receive the paging message. If not, the routine proceeds to step 614, where the information is transmitted to another satellite in the same orbiting plane or an adjacent orbiting plane so as to deliver the paging message to the paging receiver as directed by the control station. Conversely, if the determination of decision 612 is that the pager is within the communication abilities of the satellite, the routine proceeds to step 616, which transmits the paging message either directly to the pager or to a ground station or local station as determined appropriate by examination of the instructions of the control station. (As previously mentioned, transmissions toward a ground station may be made with a lower satellite transmitter power since the preferred ground station employs a high gain antenna).

Assuming that the determination of 610 is that information was not received from the control station, the routine proceeds to decision 618, which determines whether the information was received from another satellite. If so, decision 620 determines whether the information is directed towards a paging receiver. That is, aside from general satellite control and orbit maintenance information, an inter-satellite communicate is generally information being directed towards the control station, or information from the control station being directed towards one or more pagers. Thus, a negative determination of decision 620 causes decision 622 to determine whether the satellite is currently over the control station. If not, the information is transmitted to yet another satellite in the satellite network so as to direct the information to the control station (step 624). However, if the satellite is over the control station, step 625 transmits the information to the control station for processing as previously discussed. Conversely, if the determination of decision 620 is that the information is directed towards a pager, decision 623 determines whether the information is directed for the area within its beam "footprint". If not, the pager (or pagers) that are to receive this message are not beneath the satellite, and therefore, the paging information must be forwarded to another satellite for delivery (step 624). However, if the determination of decision of 623 is that the information is directed for the geographic area below, the routine proceeds to step 626, where the antenna beam (footprint) is selected in accordance with the instructions provided by the control station. As previously mentioned, the control station instructions are generated primarily based upon the coverage wishes and desires of the individual users, and determines (in part) the amount of billing that will be generated for the paging event. After the beam pattern of the satellite has been appropriately selected, the preferred paging transmit frequency and protocol are selected (steps 628 and steps 630) in accordance with the preferred message delivery request specified by the paging subscriber and commanded by the control station. Once these adjustments have been made, the information is transmitted (step 632) towards the planet to be received either by the paging receiver or by a ground station that will rebroadcast the information in an appropriate format. Thus, the satellite and/or associated ground station will adapt its transmission and signalling format for the convenience of the paging receiver so that the receiver of any manufacturer can operate in the present system.

THE CONTROL STATION(S)

Figure 7:
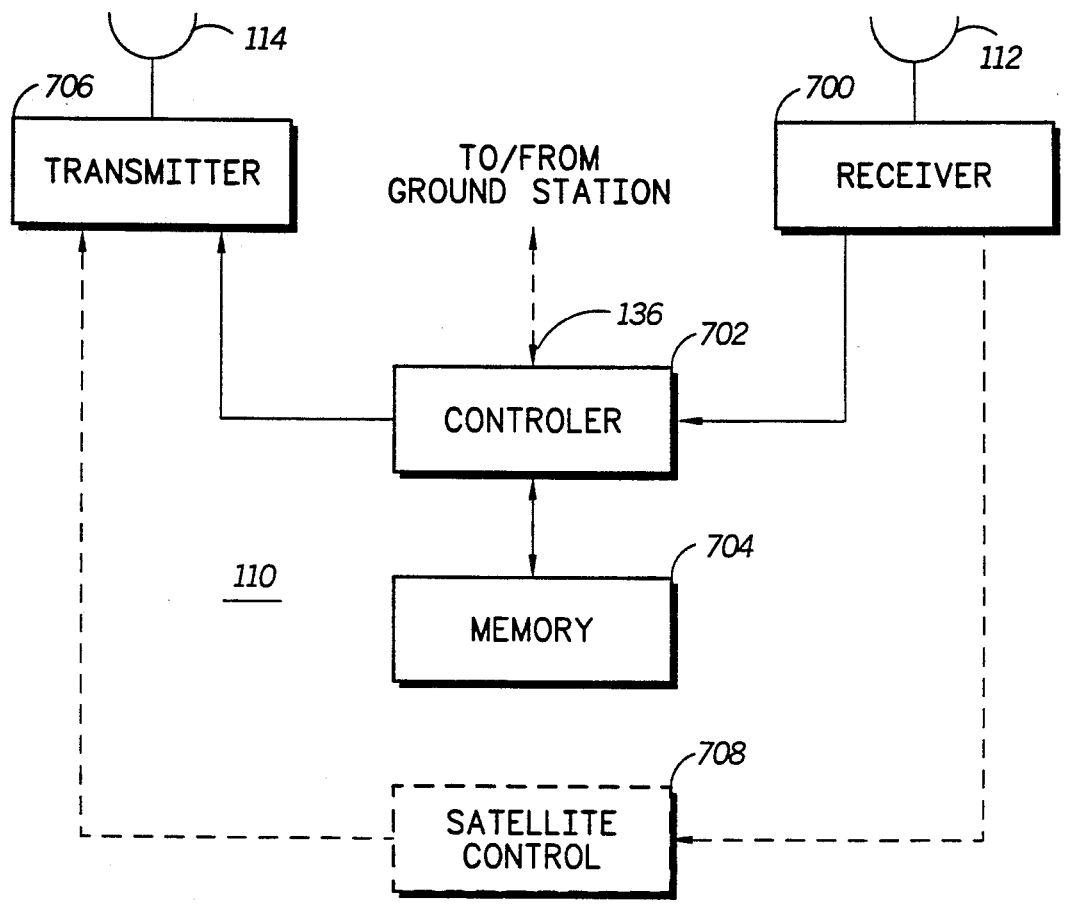
FIG. 7 is a block diagram of the control station of FIGS. 2 or 5.

Referring to FIG. 7, a block diagram of the control station 110 is shown. The control station 110 receives information from the satellite network via a receive antenna 112 and a receiver 700. This information is routed to a controller 702, which in one embodiment comprises an MC68030 microcontroller manufactured by Motorola, Inc., or its functional equivalent. The controller 702 operates to process paging requests to determine where and how the paging messages should be delivered. This is accomplished primarily by examination of a data library stored in a memory 704, which contains a suitable amount of type of memory to store operating characteristics and instructions for each receiver registered to operate on the global paging system. After processing this information, the paging message is forwarded to a transmitter 706 for transmission via an antenna 114 to the satellite network. Optionally, satellite control circuitry 708 may be resident within the central station and each terrestrial station to provide satellite orbit maintenance, position tracking, and other control functions well known in the art for maintenance of the satellite network. Alternately, satellite control maintenance may take place from one or more another facilities designed to track and maintain the satellite network. As previously discussed, for those terrestrial stations and local systems within the same physical area of the control station 110, an optional direct link 136 may be used by the present invention to off load satellite up-link and down-link traffic in the nearby geographic area.

Figure 8:
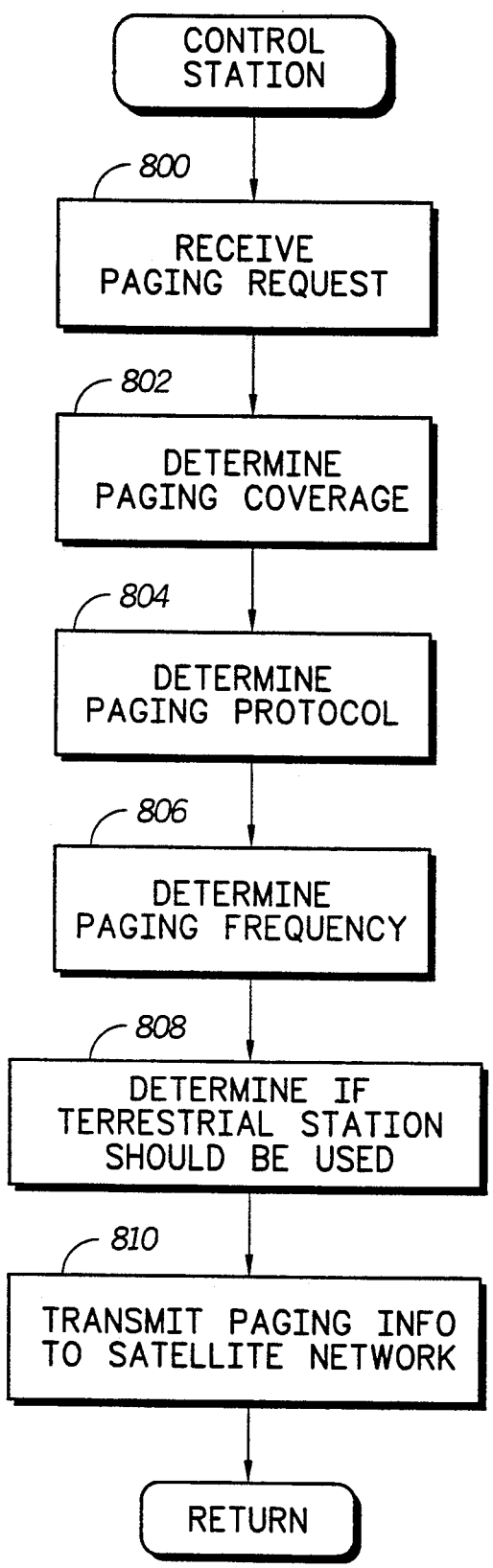
FIG. 8 is a flow diagram illustrating the operation of the control station of FIG. 7.

Referring to FIG. 8, the routine followed by the control station 110 to process a paging request is shown. In step 800, a paging request is received by the control station from the satellite network. Following this, the controller 702 examines the memory 704 to determine the amount of paging coverage desired by the individual user. This, in part, will determine the billing amount for the paging event about to be broadcast. Also, the memory 704 contains information specified by the user for defining the preferred paging protocol that should be used (step 804). Additionally, the paging frequency has preferrably also been specified by the paging user (step 806). Finally, the control station 110 determines whether a terrestrial station should be used (step 808) to relay the information (either directly or through a conventional local system) to the paging receiver. After these determination are made in accordance with the instructions of the paging user and applicable location information, the paging information and appropriate control information is transmitted to the satellite network (step 810). In this way, the paging receiver can receive a paging message directly from the satellite, from a terrestrial station (or both) or from an existing local system using any of the known (standard) paging formats so that the entire satellite network becomes transparent to the paging user.

THE GROUND STATION(S)

Figure 9:
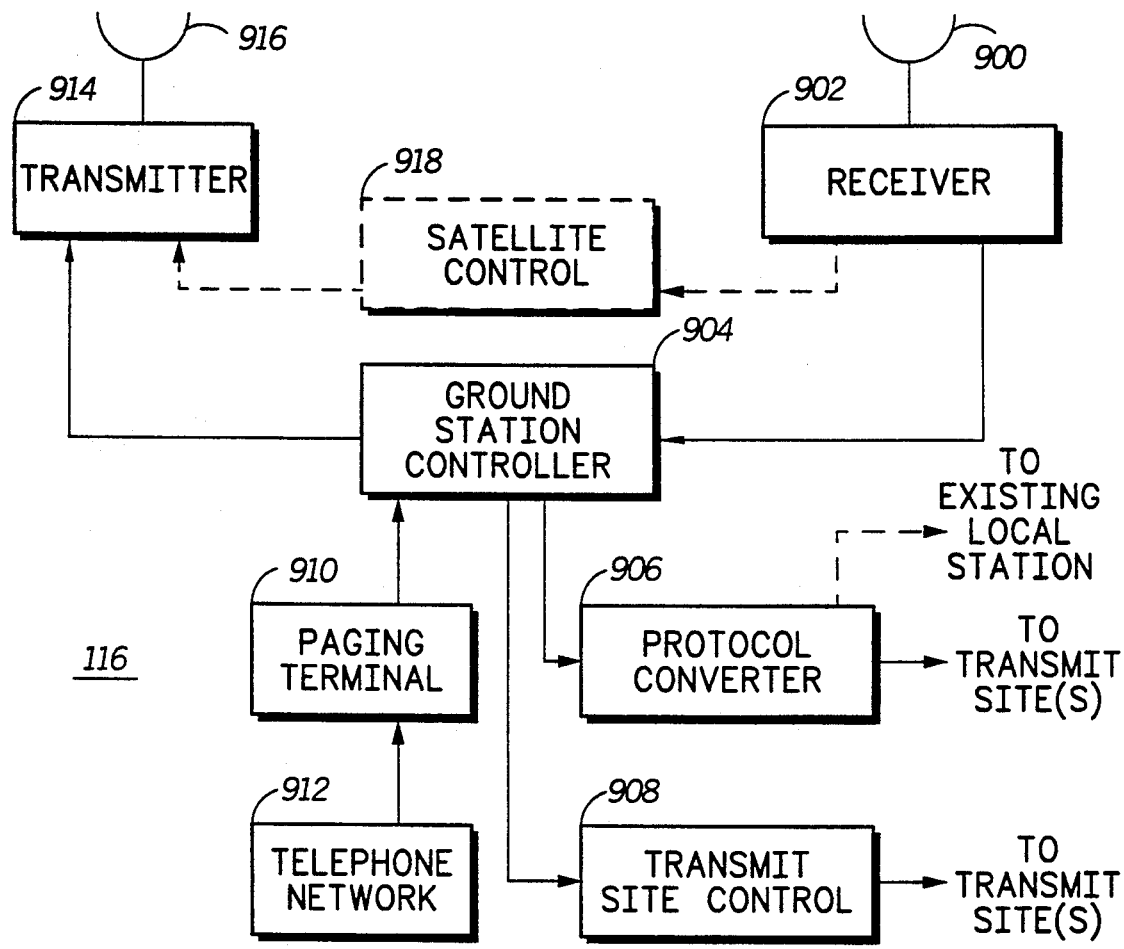
FIG. 9 is a block diagram of a ground station in accordance with the present invention.

Referring to FIG. 9, there is shown a block diagram of a terrestrial or ground station 116 in accordance with the present invention. Down-link information from the satellite network is received by an antenna 900 and decoded by a receiver 902 of the ground station control 904. The ground station controller 904 processes this information to extract instructions from the control station as to the frequency and paging protocol that should be used in the delivery of the paging message to the paging receiver. The controller 904, in one embodiment, may comprises an MC68030 microcontroller manufactured by Motorola, Inc., or its functional equivalent. In accordance with the instructions from the control station, the ground station controller 904 controls the protocol converter 906 so as to select (or convert) to the appropriate protocol. Fundamentally, the protocol converter 906 operates to decode whatever format was used by the satellite for the down-link message to extract the paging message. Once the message has been extracted, it can be re-encoded in any selected paging protocol for subsequent transmission to the paging receiver. Typically, this is accompanied via transmissions from the transmit sites 130 associated with the terrestrial station, or by conversion of the paging message into a standard paging request to an existing local station 132 as has been previously discussed. In addition to selecting the appropriate protocol, the ground station controller 904 controls one or more transmit site controllers 908, which operate to control the local transmit sites 130 in parameters such as frequency selection, the number of sites that should transmit the signal, and whether the signal should be simulcast from several transmitters as is known in the art.

To generate a paging request, the ground station 116 incorporates a paging terminal 910 to receive messages from public or private telephone networks 912. The paging terminal operates the format and generates the appropriate request, which is forwarded to the ground station controller before being transmitted to the satellite network via a transmitter 914 and an up-link antenna 916. Optionally, as discussed in conjunction with the control station, satellite control circuitry 918 may be incorporated into the terrestrial or ground stations to provide control and maintenance of the satellite network.

Figure 10A:
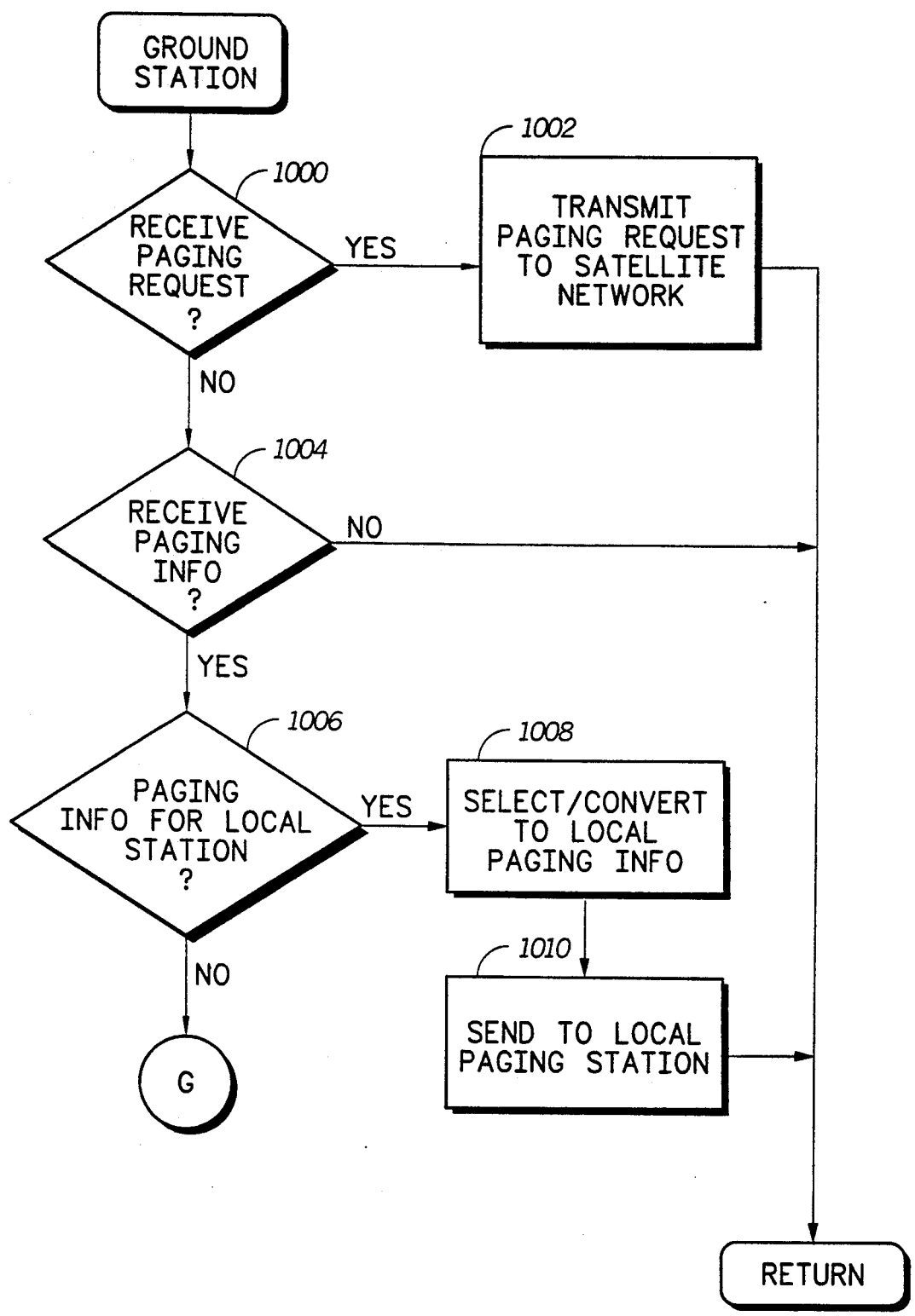
FIGS. 10a and 10b are flow diagrams illustrating the operation of the ground station of FIG. 9.
Figure 10B:
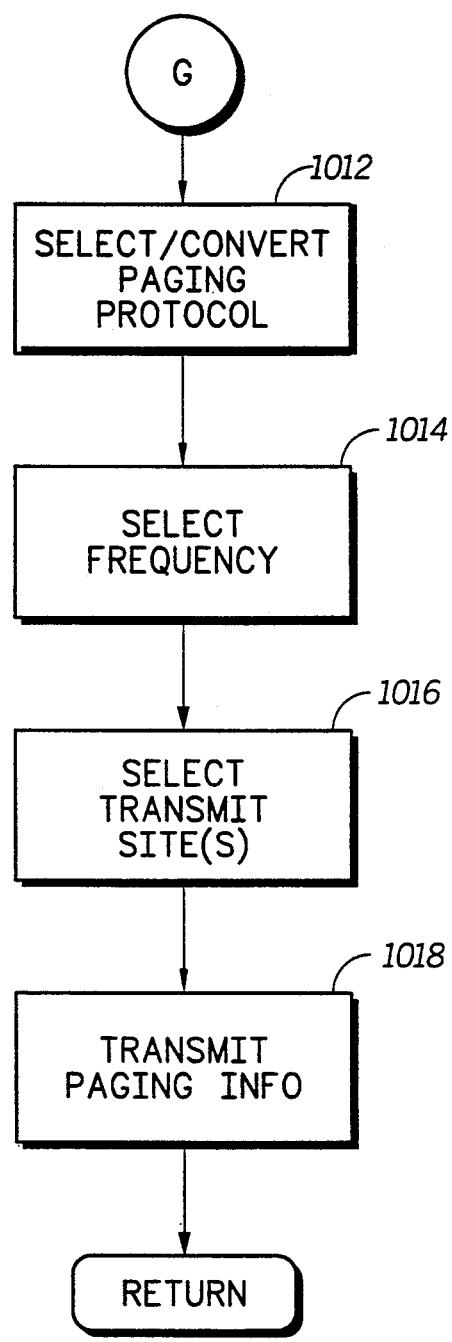

Referring to FIGS. 10a and 10b, the preferred sequence of operations of the ground station 116 is illustrated. The routine begins in step 1000, which determines whether a paging request has been received. If so, the request is properly formatted and transmitted to the satellite network for routing to the control station as has previously been described (step 1002). Conversely, if the determination of decision 1000 is that a paging request has not been received the routine proceeds to decision 1004, which determines whether paging information has been received from the satellite network. Is so, decision 1006 determines whether the paging information should be processed to represent an existing local paging request and forwarded to a contemporary local station for transmission. If so, the routine proceeds to step 1008, where the down-link protocol used from the satellite is converted into the appropriate "standard" paging format for the existing contemporary local system (which is sent to the local system in step 1010 for transmission).

Assuming that the determination of decision 1006 is that the paging information is not for a local station, the routine proceeds to step 1012 for transmission from the transmit site(s) associated with the terrestrial station. After examining the instructions from the control station, the terrestrial station operates to select the paging protocol or convert from the down-link protocol to appropriate paging protocol for the convenience of the paging receiver. Following this, the preferred paging frequency is selected in accordance with the user's instructions (step 1014). Next, the number and location of transmit site(s) to be used to broadcast the message are determined (step 1016) prior to transmission of the paging information to the paging receiver (1018).

THE PAGING RECEIVER(S)

Figure 11:
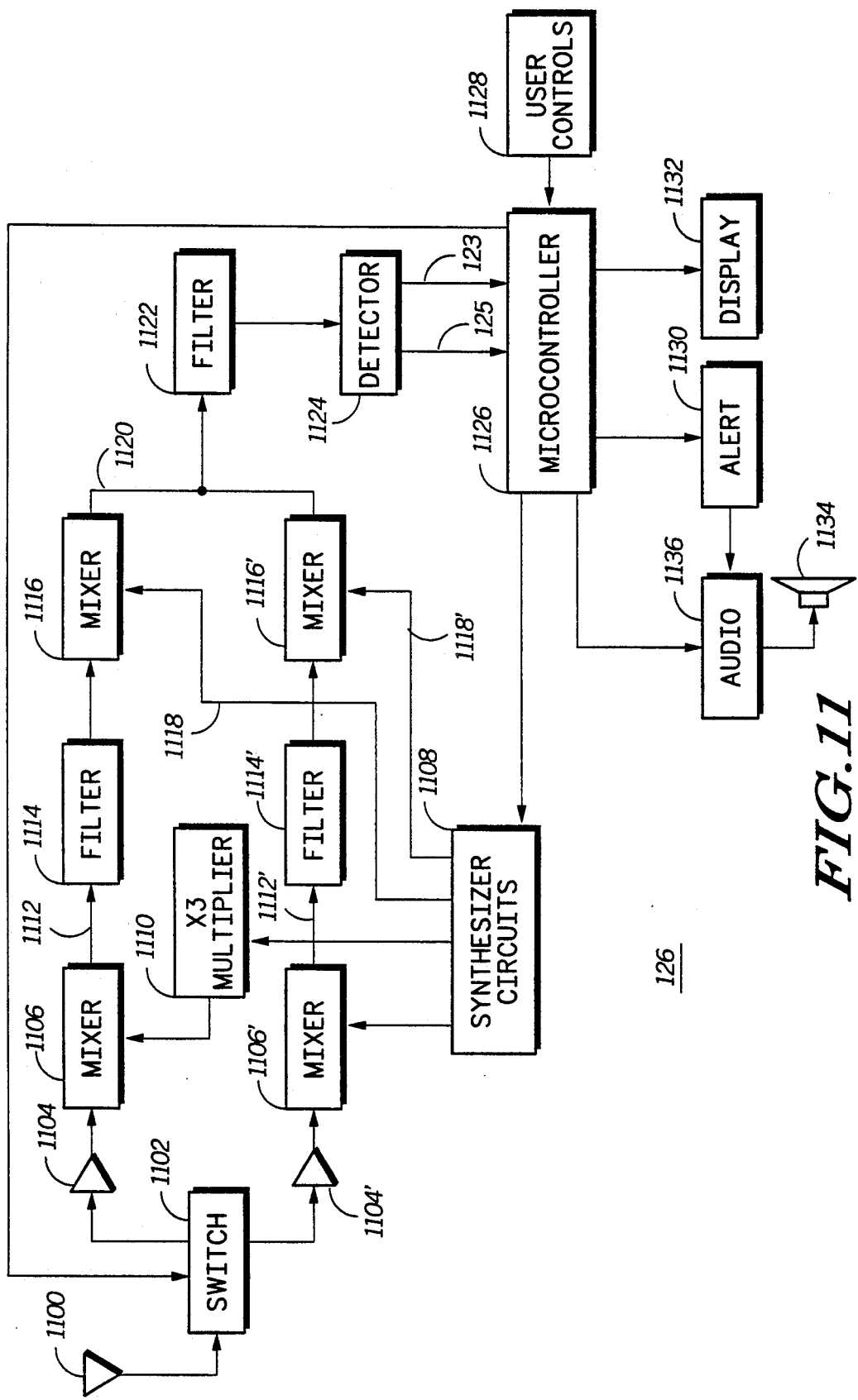
FIG. 11 is a block diagram of a selective call receiver (pager) in accordance with the present invention.

Referring to FIG. 11, there is shown a block diagram of a paging receiver 126 in accordance with the present invention. Operationally, the paging messages are received by an antenna 1100, which is forwarded to an antenna switch 1102. The position of the switch will route the received information either through the satellite compatible "front-end" portion or the terrestrial station compatible "front-end" of the paging receiver 126. Thus, one output of the switch 1102 routes the received signal to an an RF amplifier 1104, which preferably amplifies signal in the 1.5 GHz satellite frequency range. The amplified signals are applied to a mixer 1106, which receives a local oscillator signal from synthesizer circuitry 1108. To receive satellite based signals, the local oscillator signal is multiplied by a multiplier 1110 so as to appropriately demodulate the high frequency satellite signal. The mixer 1106 provides a first IF signal 1112 to an IF filter 1114, which is coupled to a second mixer 1116. The mixer 1116 accepts another local oscillator signal 1118 from the synthesizer circuitry 1108 and provides a second IF signal 1120, which is filtered by an IF filter 1122. According to the invention, this second IF stage is common to both the terrestrial and receiver recovery section of the paging receiver.

To receive terrestrial based signals, the antenna switch 1102 may route the signal to an RF amplifier 1104', which comprises an amplifier designed to amplify frequencies in the UHF or VHF frequency range. This signal is mixed by a mixer 1106' to provide a first IF signal 1112' to an IF filter 1114'. The filter signal is again mixed in a second mixer 1116' by another local oscillator 1118' from the synthesizer circuitry 1108. This again produces the common second IF signal 1120, which is filtered by the second IF filter 1122. In either event, the filtered second IF signal is processed by a detector 1124, which recovers the paging information for further processing by a microcontroller 1126. In one embodiment of the invention, the microcontroller 1126 may comprise an MC68HC11 microcomputer manufactured by Motorola, Inc., or its functional equivalent.

To receive paging informations from any of the several known "standard" land based systems, a terrestrial station of the present invention, or directly from a satellite, the microcontroller 1126 selects a decoding protocol (some pagers may use only one protocol) and controls the synthesizer circuitry 1108 so as to appropriately mix these signals down in the second IF signal 1120. Additionally, since the synthesizer circuitry 1108 is programmed by the microcontroller 1126, the paging receiver 126 of the present invention can scan several frequencies merely by reprogramming the synthesizer circuitry in any of the known synthesizer programming techniques known in the art.

According to the invention, the paging receiver 126 preferably operates in an automatic mode to first scan for a terrestrial based transmitter before relying upon the satellite network for direct transmission in any city or geographic area that offers a ground based transmitting site(s). By first scanning for a terrestrial based station, priority is given to the terrestrial channels. That is, for the paging receiver 126 described herein, when the paging customer specifies the area or areas in which he or she desires to receive paging messages, if a terrestrial based transmitting site is available to deliver these messages they will be used. This practice "off-loads" the satellite network and improves system wide paging message through-put. In one preferred scanning technique, the paging receiver 126 operates to alternately scan for terrestrial and satellite signal. In another embodiment, all (or a portion) of known terrestrial signals could be first scanned, followed by the paging receiver's scanning of one or more satellite channels.

Of course, the automatic mode discussed above could be over-ridden in favor of a manual mode. To do this, the microcontroller 1126 receives instructions and commands from user controls 1128, which include conventional functions such as "read" and "lock" function selections and other known user controls commonly employed on contemporary pagers. Additionally, one such user control (i.e., a Satellite/Terrestrial switch) may operate to force the microcontroller 1126 to control the switch 1102 such as to permanently select either the satellite based or the terrestrial based demodulating sections of the paging receiver 126. In this way, the paging customer (user) is given more control over how paging messages are received.

The automatic mode could also be over-ridden by instructions from the control station, which are incorporated into a paging message. This procedure may be preferably employed to re-route the delivery of paging messages to ease a congested paging traffic path or to accommodate the paging user when their preferred (specified) message delivery path has malfunctioned.

When the message is received, it is customary for the microcontroller 1126 to activate an alert circuit 1130, which may include silent alert, visual alert, or audible alert as is known in the art. Data messages may be displayed upon any suitable display means 1132, while tone, or tone-and-voice messages are presented to the user via a speaker 1134 (after amplification and filtering through audio circuits 1136). In this way, the paging receiver 126 of the present invention may receive paging messages directly from the satellite network or a terrestrial based ground station. Additionally, the paging receivers manufactured by other manufactures may operate on the present inventive system since the system adapts that portion of itself necessary to deliver any paging message in any paging format anywhere in the world.

What is claimed is:

1. A paging communication system, comprising:
   a plurality of terrestrial receivers, at least some of which receive paging information from at least one satellite and from at least one of a plurality of terrestrial stations;
   the plurality of terrestrial station communicating the paging information with the at least one satellite, and adapting the paging information so as to be compatible with at least one of the plurality of terrestrial receivers;
   the at least one satellite communicating the paging information to the at least one of the plurality of terrestrial stations and at least one control station, and further directly transmitting the paging information to the at least one of the plurality of terrestrial receivers; and
   the at least one control station determining where to deliver the paging information and operational parameters and operational protocols to deliver the paging information to the plurality of terrestrial receivers.

2. The system of claim 1, which includes a plurality of satellites arranged to form a satellite network which adapts itself to communicate the paging information to the at least one of the plurality of terrestrial receivers in accordance with the operational parameters and the operational protocols, the operational parameters and the operational protocols determined in response to instructions provided by an individual having the at least one of the plurality of terrestrial receivers designated to receive the paging information.

3. The system of claim 2, wherein the satellite network adapts itself to communicate the paging information to the at least one of the plurality of terrestrial receivers in accordance with the operational protocols, the operational protocols comprising at least a paging communication protocol.

4. The system of claim 2, wherein the satellite network adapts itself to communicate the paging information to the at least one of the plurality of terrestrial receivers in accordance with the operational parameters, the operational parameters comprising at least a paging communication frequency.

5. The system of claim 1, wherein the at least one control station includes a memory for storing at least information representing a preferred paging area for the at least one of the plurality of terrestrial receivers operative in the system.

6. The system of claim 1, wherein the at least one control station comprises memory means for storing the operational parameters and the operational protocols, and wherein the at least one control station determines where and how to deliver the paging information in accordance with the operational parameters and the operational protocols stored within the memory means.

7. The system of claim 1, wherein each of the at least some of the plurality of terrestrial receivers receiving the paging information from the at least one satellite and from the at least one of the plurality of terrestrial stations comprises:
   first receiving means for receiving the paging information from the at least one satellite;
   second receiving means for receiving the paging information from the at least one of the plurality of terrestrial stations; and
   control means for controlling the first receiving means and the second receiving means to provide priority operation to the second receiving means for receiving the paging information from the at least one of the plurality of terrestrial stations to attempt to receive the paging information therefrom before attempting to receive the paging information from the at least one satellite.

8. The system of claim 1, wherein the control means includes means for over-riding the priority operation provided to the second receiving means the paging information from the at least one of the plurality of terrestrial stations.

9. The system of claim 8, wherein the means for over-riding the priority operation provided to the second receiving means the paging information from the at least one of the plurality of terrestrial stations is responsive to operator entered commands.

10. The system of claim 8, wherein the means for over-riding the priority operation provided to the second receiving means the paging information from the at least one of the plurality of terrestrial stations is responsive to commands contained in the paging information.

11. A paging communication system, comprising:
 a plurality of terrestrial receivers, at least some of which receive paging information from at least one satellite and from at least one of a plurality of terrestrial stations;
 the plurality of terrestrial stations being communicating the paging information with the at least one satellite, and adapting the paging information so as to be compatible with at least one of the plurality of terrestrial receivers;
 the at least one satellite communicating the paging information to the at least one of the plurality of terrestrial stations and at least one control station, and further directly transmitting the paging information to the at least one of the plurality of terrestrial receivers; and
 the at least one control station being determining where to deliver the paging information and operational parameters and operational protocols to deliver the paging information to the plurality of terrestrial receivers, wherein the control station includes a memory for storing the operational parameters, and wherein the operational parameters comprise at least information representing a preferred paging frequency for the at least one of the plurality of terrestrial receivers operative in the system.

12. A paging communication system, comprising:
 a plurality of terrestrial receivers, at least some of which receive paging information from at least one satellite and from at least one of a plurality of terrestrial stations;
 the plurality of terrestrial stations communicating the paging information with the at least one satellite, and adapting the paging information so as to be compatible with at least one of the plurality of terrestrial receivers;
 the at least one satellite communicating the paging information to the at least one of the plurality of terrestrial stations and at least one control station, and further directly transmitting the paging information to the at least one of the plurality of terrestrial receivers; and
 the at least one control station determining where to deliver the paging information and operational parameters and operational protocols to deliver the paging information to the plurality of terrestrial receivers, wherein the at least one control station includes a memory for storing the operational protocols, and wherein the operational protocols comprise at least information representing a preferred paging protocol for the at least one of the plurality of terrestrial receivers operative in the system.

* * * * *

UNITED STATES PATENT AND TRADEMARK OFFICE
CERTIFICATE OF CORRECTION

PATENT NO. : 5,301,354
DATED : April 5, 1994
INVENTOR(S) : Schwendeman, et al.

It is certified that error appears in the above-indentified patent and that said Letters Patent is hereby corrected as shown below:

On title page, change [*] to read as follows:

"Aug. 24, 2000" should read --Apr. 23, 2008--.

Signed and Sealed this

Twenty-seventh Day of September, 1994

Attest:

BRUCE LEHMAN

Attesting Officer      Commissioner of Patents and Trademarks